(12) United States Patent
Harrison

(10) Patent No.: US 9,588,407 B1
(45) Date of Patent: Mar. 7, 2017

(54) INVERTIBLE TIMER MOUNT FOR CAMERA

(71) Applicant: GoPro, Inc., San Mateo, CA (US)

(72) Inventor: Ryan Harrison, El Granada, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/092,605

(22) Filed: Apr. 6, 2016

(51) Int. Cl.
*G03B 37/02* (2006.01)
*F16M 11/08* (2006.01)
*H04N 5/232* (2006.01)
*G03B 17/56* (2006.01)
*F16M 11/20* (2006.01)

(52) U.S. Cl.
CPC ....... *G03B 17/561* (2013.01); *F16M 11/2014* (2013.01); *G03B 37/02* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 4,864,335 A * | 9/1989 | Corrales | ................ | G03B 37/02 352/69 |
| 5,021,813 A * | 6/1991 | Corrales | ................ | G03B 37/02 396/24 |
| 9,229,299 B1 * | 1/2016 | Morlon | ................ | G03B 17/561 |
| 9,360,742 B1 * | 6/2016 | Harrison | ............. | G03B 17/561 |
| 2006/0072020 A1 * | 4/2006 | McCutchen | ........... | G03B 17/02 348/218.1 |
| 2015/0078737 A1 * | 3/2015 | Albonico | ............. | G03B 17/568 396/48 |
| 2016/0139494 A1 * | 5/2016 | Tien | ..................... | G03B 17/561 396/428 |

* cited by examiner

*Primary Examiner* — W B Perkey
(74) *Attorney, Agent, or Firm* — Fenwick & West LLP

(57) ABSTRACT

A timer mount system is configured for use with a camera and a camera mount to capture panoramic videos or photographs in multiple rotational directions. The timer mount system comprises a housing, a drive shaft, a panning mechanism, a first mount component, and a second mount component. Within the housing, the drive shaft is coupled to the panning mechanism, which stores rotational energy when wound in a rotational direction and then causes the drive shaft to rotate in a reverse rotational direction when released. The first mount component is configured to secure to and rotate with the drive shaft, while the second mount component is configured to remain stationary while allowing the drive shaft to rotate freely. A first configuration allows the first mount component to rotate in a first rotational direction, and a second configuration allows the first mount component to rotate in a second rotational direction.

14 Claims, 6 Drawing Sheets

FIG. 1A FIG. 1B

INVERTIBLE TIMER MOUNT FOR CAMERA

BACKGROUND

Technical Field

This disclosure relates to cameras, and more specifically, to an invertible timer mount for a camera.

Description of the Related Art

Digital cameras are increasingly used in outdoors and sports environments. Sometimes, it is desirable to capture a video or a photograph with a very wide-angle or panoramic view in these environments. Using today's camera systems, capturing a high-quality panoramic video or photograph can be difficult for a user, resulting in distortion, inconsistencies, or un-matching frames in the video or photograph.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
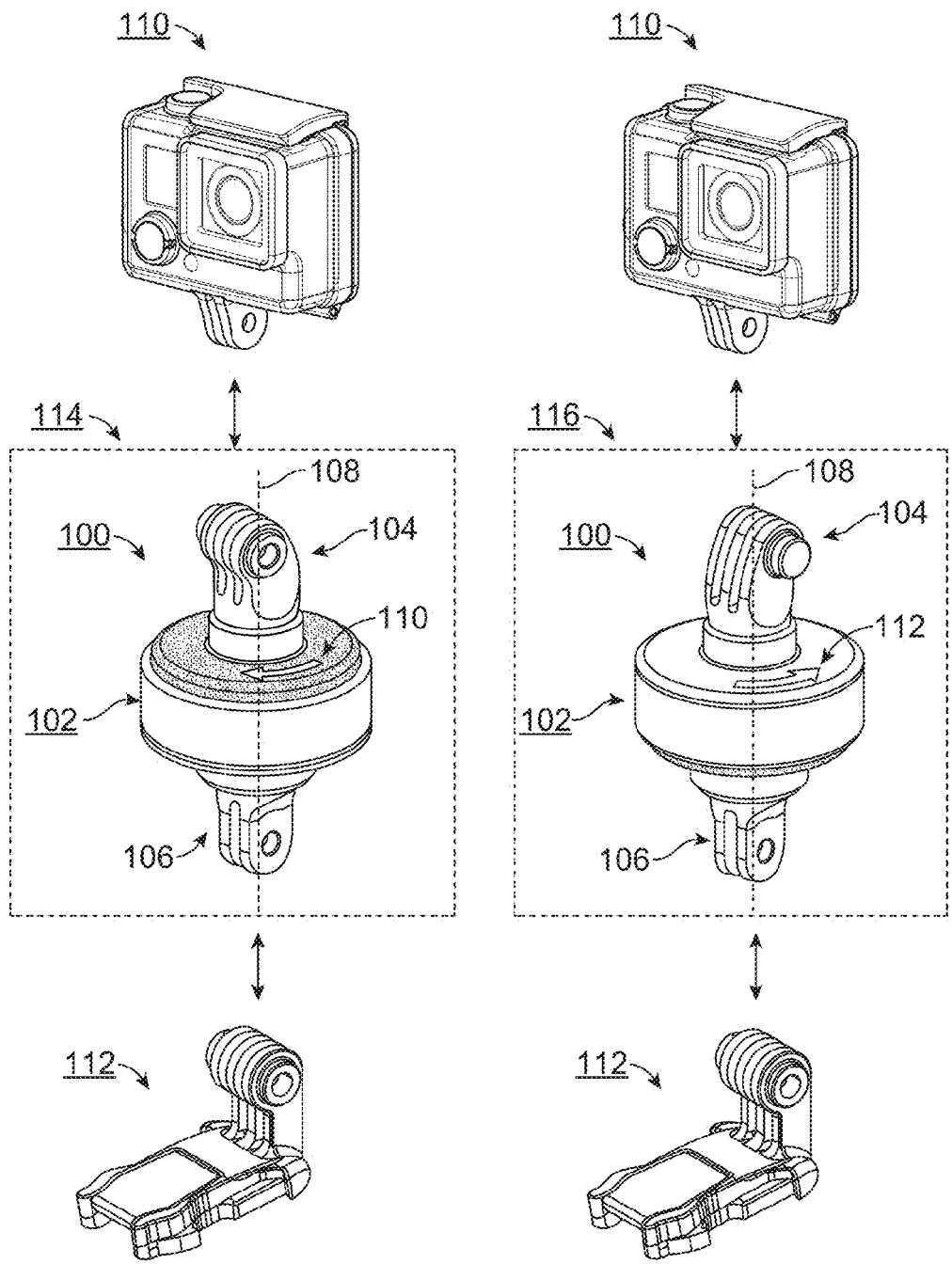
FIG. 1a illustrates a first configuration of an invertible timer mount system, according to one embodiment.
FIG. 1b illustrates a second configuration of an invertible timer mount system, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one embodiment, an invertible timer mount system is configured for use with a camera and a camera mount to capture panoramic videos or photographs in a plurality of rotational directions. The invertible timer mount system comprises a housing, a drive shaft, a panning mechanism, a first mount component, and a second mount component. The housing further comprises a first plate and a second plate, wherein the first plate secures to a top surface of the housing, and the second plate secures to a bottom surface of the housing. Each plate comprises a securing mechanism on an exterior surface, each securing mechanism further comprising an opening through which a respective end of the drive shaft extends. Within the housing, the drive shaft is coupled to the panning mechanism, which stores rotational energy and causes the drive shaft to rotate along a rotational axis. The first mount component comprises a socket configured to removeably secure to the first or second end of the drive shaft. The second mount component comprises a reciprocal securing interface to removeably secure to a securing mechanism of the first or second plate and further comprises a recess into which the first or second end of the drive shaft extends and rotates freely.

In a first configuration, the first mount component couples to a first end of the drive shaft, such that the first mount component rotates with the drive shaft in a first rotational direction. The second mount component secures to the securing mechanism of the second plate, such that the second mount component remains stationary while the drive shaft rotates freely within the recess. In a second configuration, the first mount component couples to the second end of the drive shaft, such that the first mount component rotates with the drive shaft in a second rotational direction. The second mount component secures to the securing mechanism of the first plate, such that the second mount component remains stationary while the first end of the drive shaft rotates freely within the recess. A user can convert the invertible timer mount system from the first configuration to the second configuration, and vice versa, without the use of a tool set.

The first mount component is configured to secure to a camera, and the second mount component is configured to secure to a camera mount component. When the camera and the camera mount are secured to the timer mount system, a user prepares the timer mount system for panoramic capture in a rotational direction by winding the timer element in a reverse rotational direction. Once the timer element is wound, the user releases the timer element, allowing the timer element to pan around at a fixed rate and thus rotating the camera attached to the first mount component relative to the stationary second mount component.

Example Timer Mount Configuration

FIGS. 1a and b illustrate multiple configurations of an invertible timer mount system, according to one embodiment.

The timer mount system 100 comprises a timer element 102, a first mount component 104, and a second mount component 106. The timer mount system 100 is configured to removeably secure to a plurality of reciprocal mount components, camera accessories, cameras, and the like. When the timer mount system 100 is removeably secured to a camera, such as camera 110, the timer mount system enables the camera to rotate in a plurality of directions relative to a mount, allowing a user to capture panoramic photos or videos. In the embodiments of FIGS. 1a and 1b, a camera 110 is removeably secured to the first mount component 104 of the timer mount system 100, and a reciprocal camera mount 112 is removeably secured to the second mount component 106 of the timer mount system. When the camera 110 and the camera mount 112 are secured to the timer mount system 100, a user prepares the timer mount system for panoramic capture in a rotational direction by winding the timer element 102 in a reverse rotational direction. Once the timer element 102 is wound, the user releases the timer element, allowing the timer element to pan around at a fixed rate and thus rotating the camera 110 attached to the first mount component 104 relative to the stationary second mount component 106.

In some embodiments, as illustrated in FIGS. 1*a* and 1*b*, various mount components, camera accessories, cameras, and the like are removeably secured to the timer mount system 100 via interlocking protrusions. Each mount component, such as mount components 104 and 106, comprises a plurality of protrusions protruding outward that are configured to couple with a plurality of reciprocal protrusions, such as the protrusions illustrated on the camera 110 and the camera mount 112. Each protrusion comprises a hole at the distal end of the protrusion. The protrusions on each mount component interlock with the plurality of reciprocal protrusions such that the holes of each set of protrusions are aligned along an axis and such that a screw or pin can be inserted into the aligned holes, removeably securing each mount component to a reciprocal mount component, camera, camera accessory, and the like.

FIG. 1*a* illustrates the timer mount system 100 in a first configuration 114 such that the first mount component 104 is secured to a first surface (e.g., a top surface in the illustrated orientation) of the timer element 102 and the second mount component 106 is secured to a second surface (e.g., a bottom surface in the illustrated orientation) of the timer element 102, each component aligned along a rotational axis 108. In the first configuration 114, the first mount component 104 rotates in a first direction 110 after winding, (e.g., a clockwise direction) in the embodiment of FIG. 1*a*. FIG. 1*b* illustrates the timer mount system 100 in a second configuration 116 such that the first mount component 104 is secured to the second surface (e.g., the bottom surface in the illustrated orientation) of the timer element 102 and the second mount component is secured to the first surface (e.g., the top surface in the illustrated orientation) of the timer element 102. In the second configuration 116, the first mount component 104 rotates in a second direction 110 after winding, (e.g., a counter-clockwise direction) in the embodiment of FIG. 1*b*.

Figure 2:
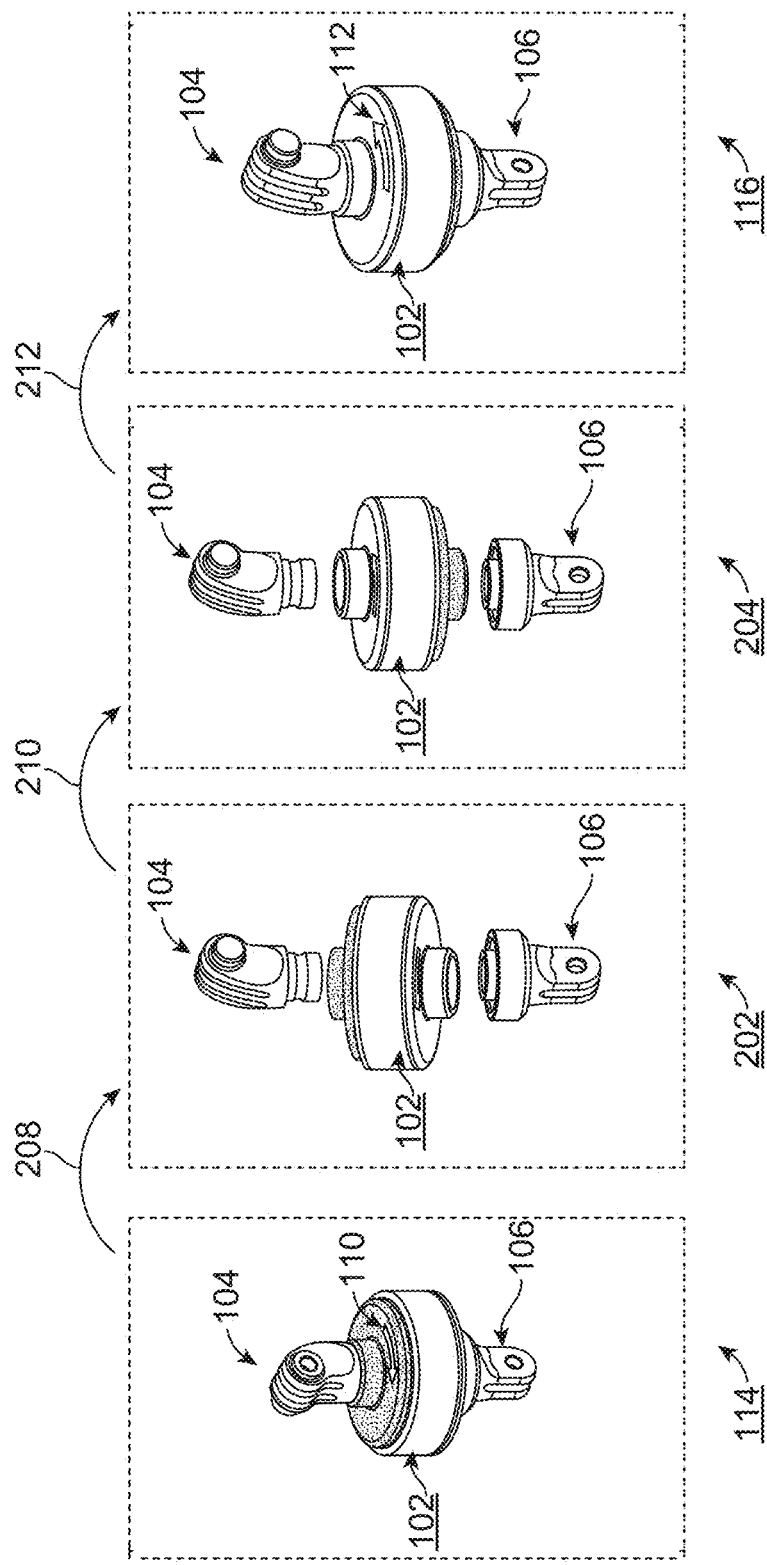
FIG. 2 illustrates a process of converting an invertible timer mount from a first configuration to a second configuration, according to one embodiment.

FIG. 2 illustrates a process to convert an invertible timer mount from a first configuration 114 to a second configuration 116 by means of a transitional state 202 and a transitional state 204, according to one embodiment. The invertible timer mount is first shown in the first configuration 114 in FIG. 2. In the first step 208, the first mount component 104 and the second mount component 106 are detached from the timer element 102, resulting in the transitional state 202. In the second step 210, the timer element 102 is then inverted, resulting in the transitional state 204. In the third step 212, the first mount component 104 and the second mount component 106 are re-attached to the timer element 102 on opposite sides, achieving the second configuration 116. The process can be reversed such that the second configuration 116 is converted to the first configuration 114. Using the process illustrated in the embodiments of FIG. 2 allows a user to change the direction of rotation of the timer mount system 100, and thus of the camera 110, to a desired direction of rotation for panoramic capture.

Figure 3:
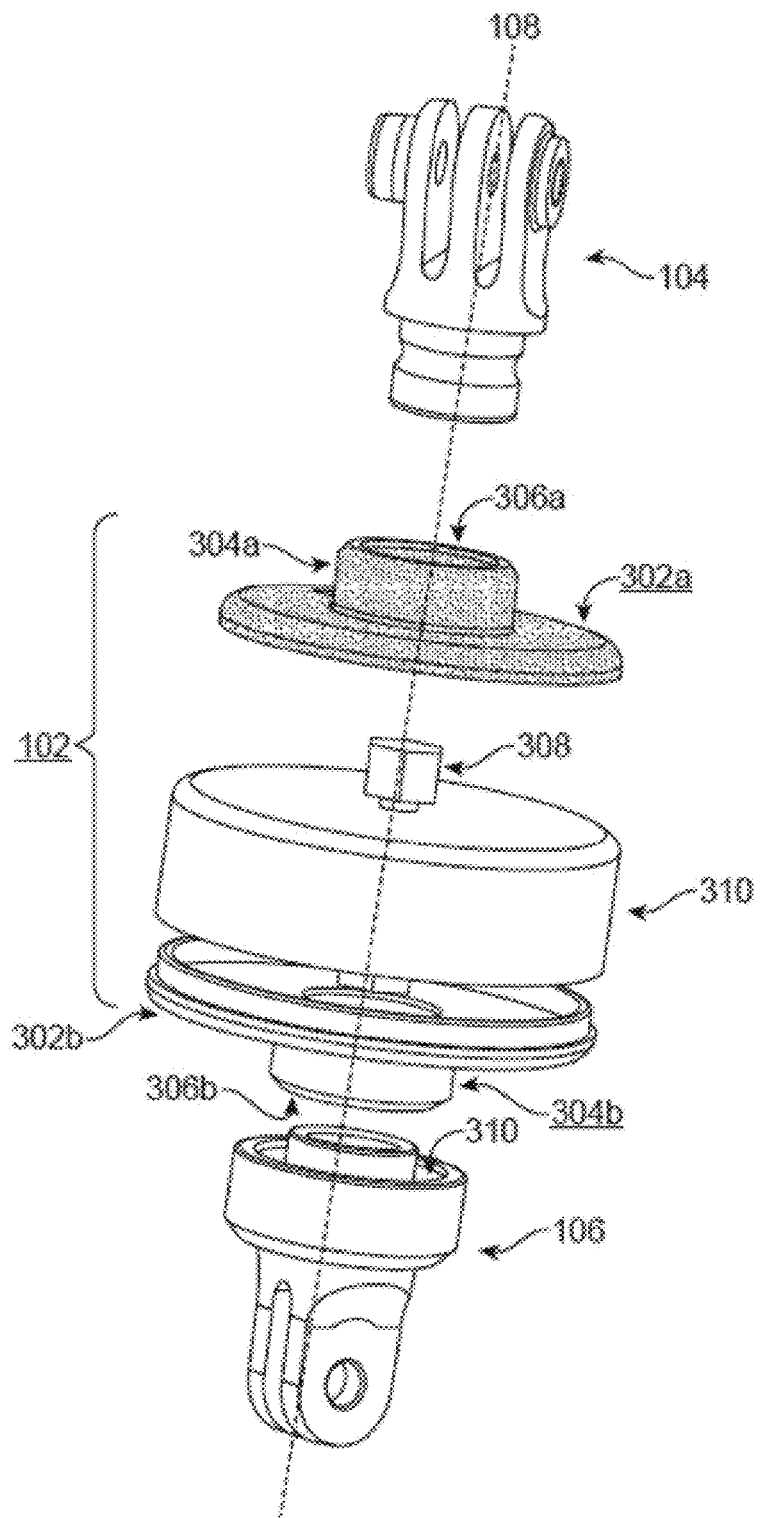
FIG. 3 illustrates an exploded view of an invertible timer mount system, according to one embodiment.

FIG. 3 illustrates an exploded view of an invertible timer mount system, according to one embodiment. The timer element 102 comprises a housing 310, a drive shaft 308, a plurality of plates 302*a*, 302*b* (collectively referred to as plates "302"), and a panning mechanism (not shown in FIG. 3) comprising various timer gears housed inside the housing 310 and coupled with the drive shaft 308. In the embodiment of FIG. 3, the rotational axis 108 extends through the center of each of these components. In other embodiments, the rotational axis 108 may extend through a different portion of each of the components. As illustrated in the embodiment of FIG. 3, a first plate 302*a* is secured to a first exterior surface of the housing 310, and a second plate 302*b* is secured to a second exterior surface of the housing, each secured to the housing surface via a securing mechanism, such as adhesive, screws, snap-fit, threaded-fit, and the like. Each plate 302 comprises a securing mechanism 304 on an exterior surface of the plate, structured such that it enables mating with a reciprocal securing interface 310 so that the second mount component 106 may be secured to either the first or second plate 302. The securing mechanism 304 further comprises an opening 306, which aligns along the rotational axis 108, so that the first mount component 104 may be secured to either the first or second plate 302. The opening 306 exposes an end of the drive shaft 308. In the embodiment of FIG. 3, the drive shaft 308 is hexagonal, but in other embodiments, the drive shaft can be a variety of geometries such that the shape is keyed to couple to a reciprocal socket. The components of the invertible timer mount system can be made of a variety of materials, such as rigid plastics or metals.

Figure 4:
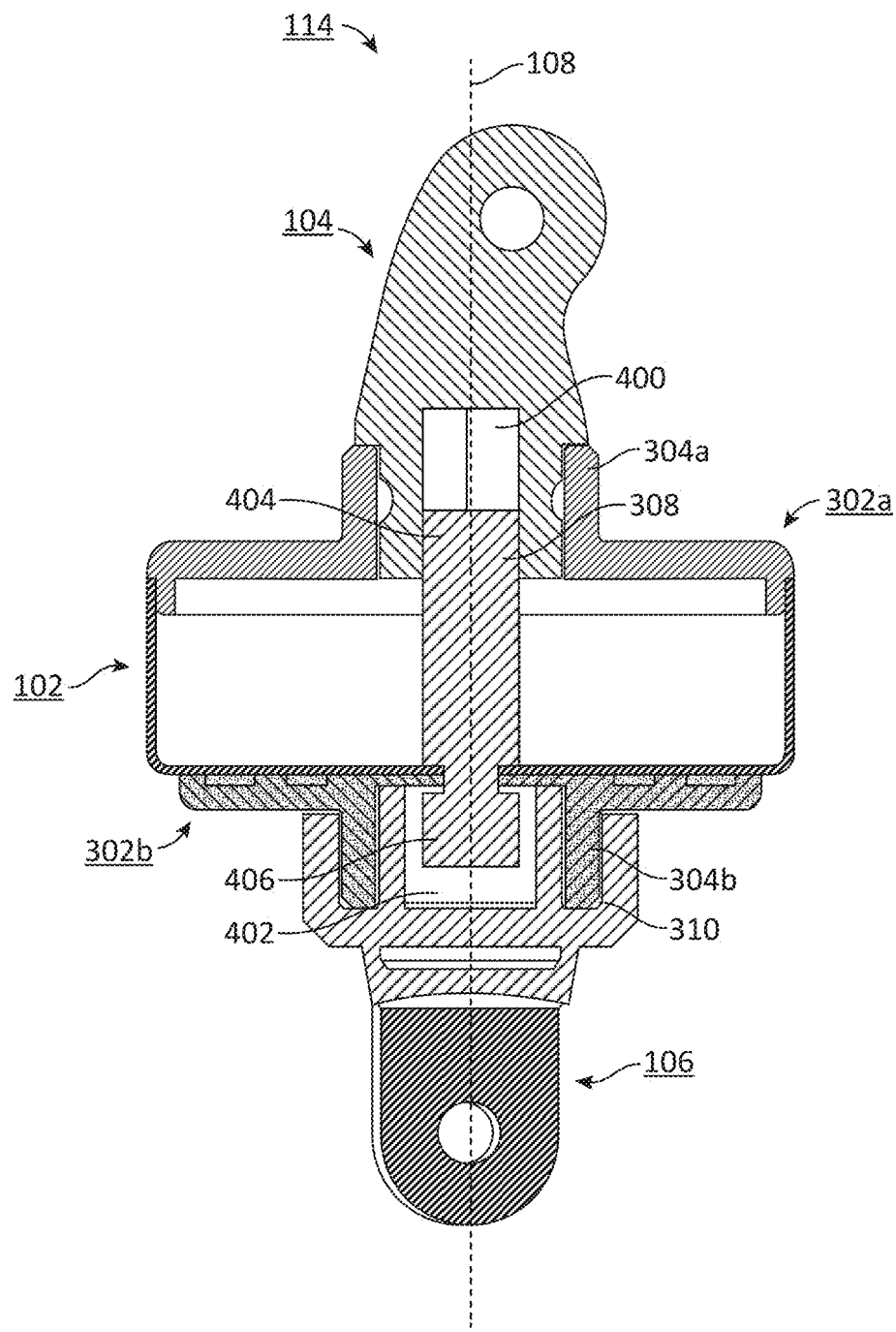
FIG. 4 illustrates a cross-sectional view of an invertible timer mount system, according to one embodiment.

FIG. 4 illustrates a cross-sectional view of an invertible timer mount system in the first configuration 114, according to one embodiment. In the embodiment of FIG. 4, the first mount component 104 is secured to the timer element by inserting a first end of the first mount component into the opening 306*a* of the first plate 302*a*. A socket 400 within the first mount component 104 is shaped such that it complements the shape of the drive shaft 308 and allows the first mount component to couple to a first end 404 of the drive shaft. When the first mount component 104 and the drive shaft 308 are coupled, the first mount component rotates with the drive shaft along the rotational axis 108. In the embodiment of FIG. 4, the second mount component 106 is secured to the timer element by mating the reciprocal securing interface 310 with the securing mechanism 304*b* of the second plate 302*b*. A recess 402 within the second mount component 106 encircles a second end 406 of the drive shaft 308 and allows the drive shaft to rotate freely within the recess so that the second mount component 106 does not rotate with the drive shaft 308. As a result, the first mount component 104 achieves a rotation with respect to the second mount component 106 as the drive shaft 308 rotates about the rotational axis 108. When the invertible timer mount system is in the second configuration 116, the socket 400 instead couples to the second end 406 of the drive shaft 308, thus similarly causing the first mount component 104 to rotate with the drive shaft 308. Furthermore, in the second configuration 116, the recess 402 of the second mount component 106 encircles the first end 404 of the drive shaft 308 without coupling to it, thus allowing the first end of the drive shaft to rotate freely within the recess.

The panning mechanism is encased within the housing 310 and is coupled to the drive shaft 308, in some embodiments. The panning mechanism is configured to store rotational energy in response to the drive shaft 308 being wound in a first rotational direction about the rotational axis and to release stored rotational energy to the drive shaft, causing the drive shaft to rotate in a second rotational direction about the rotational axis at a pre-defined rate of rotation.

Figure 5A:
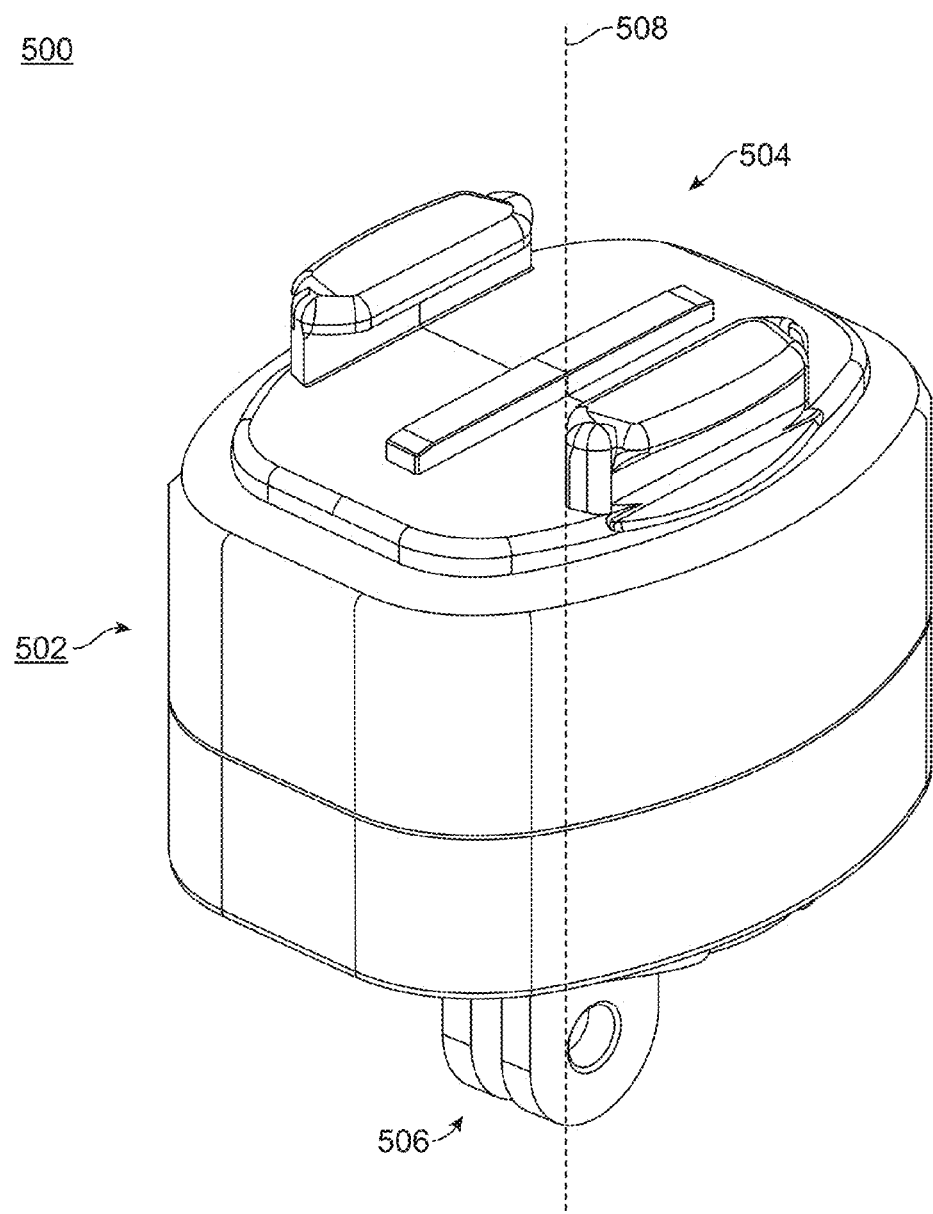
FIG. 5a illustrates a first perspective view of an additional embodiment of an invertible timer mount system.
Figure 5B:
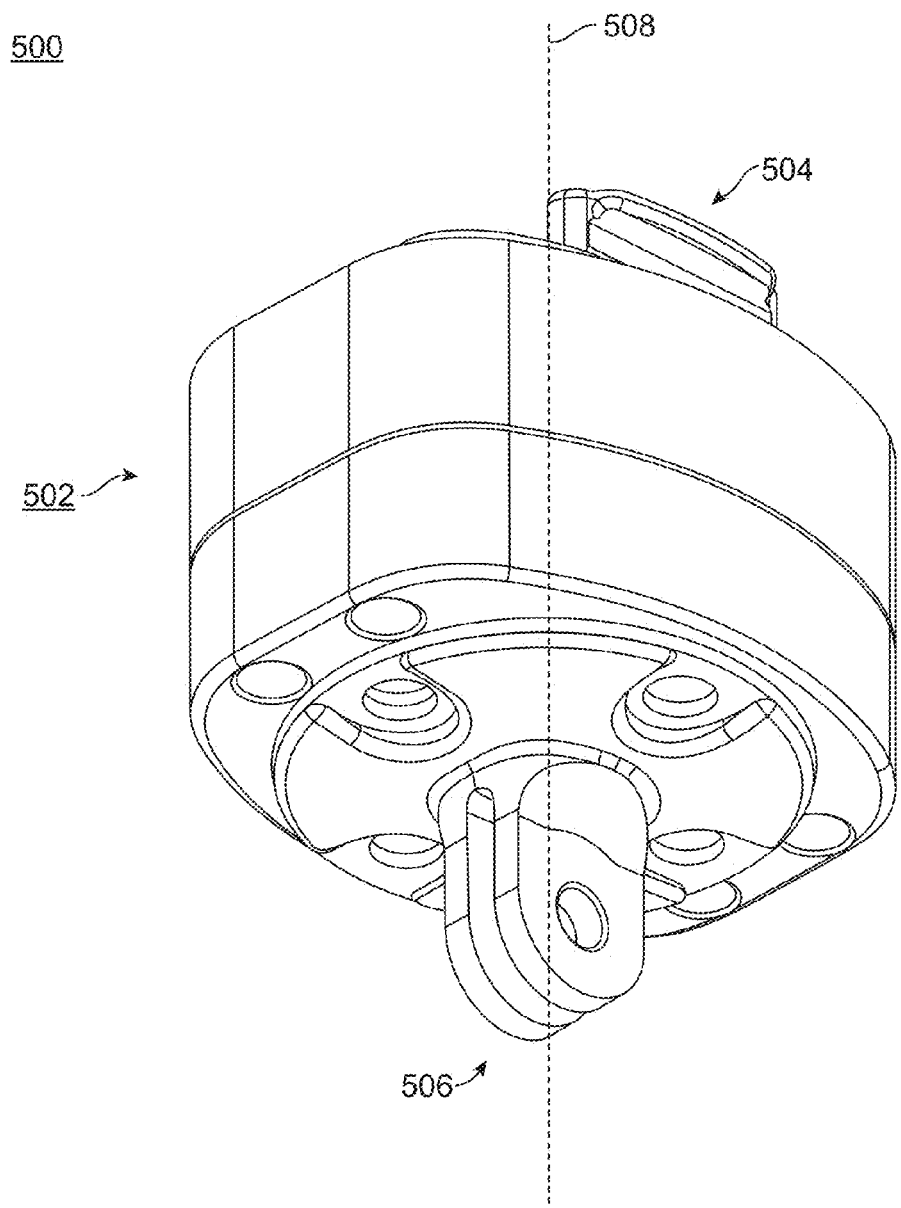
FIG. 5b illustrates a second perspective view of an additional embodiment of an invertible timer mount system.

FIG. 5*a* illustrates a first perspective view of an additional embodiment of an invertible timer mount system 500. The embodiment of FIG. 5*a* is substantially similar to the embodiments described with regards to FIGS. 1-4, comprising a housing 502, a drive shaft (not shown), a panning mechanism (not shown), a first mount component 504, and a second mount component 506. Each component is aligned along a rotational axis 508. The first mount component 504 is an additional configuration that provides a different type of coupling to a camera or a camera component. This configuration is a base that allows for quick-release coupling of the camera or the camera component, such that the use of a tool set isn't required. FIG. 5*b* illustrates a second perspective view of an additional embodiment of an invertible timer mount system.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for an invertible timer mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A timer mount system comprising:
a housing comprising a first plate and a second plate, each plate comprising respective securing mechanisms on respective exterior surfaces, the securing mechanisms comprising respective openings structured such that each of the respective openings aligns along a rotational axis, the respective securing mechanisms each structured to enable mating with a reciprocal securing interface;
a drive shaft configured to extend along the rotational axis through the respective openings of the first plate and the second plate, the drive shaft having a first end and a second end each structured to enable mating with a reciprocal socket;
a panning mechanism within the housing, the panning mechanism configured to store rotational energy in response to the drive shaft being wound in a first rotational direction about the rotational axis and the panning mechanism to release stored rotational energy to the drive shaft to cause the drive shaft to rotate in a second rotational direction about the rotational axis at a pre-defined rate of rotation;
a first mount component comprising the reciprocal socket to removeably secure to either the first or second end of the drive shaft and to mate with the first end or second end of the drive shaft such that rotation of the drive shaft about the rotational axis causes rotation of the first mount component;
a second mount component comprising the reciprocal securing interface to removeably secure to either of the respective securing mechanisms of the first or second plates of the housing, the second mount component further comprising a recess into which the first or second end of the drive shaft extends, the recess structured such that the drive shaft is rotatable within the recess without causing rotation of the second mount component.

2. The timer mount system of claim 1, wherein in a first configuration,
the first mount component secures to the first end of the drive shaft and mates with the first end of the drive shaft such that rotation of the drive shaft about the rotational axis causes rotation of the first mount component; and
the second mount component secures to the securing mechanism of the second plate and the second end of the drive shaft extends into the recess.

3. The timer mount system of claim 1, wherein in a second configuration,
the first mount component secures to the second end of the drive shaft and mates with the second end of the drive shaft such that rotation of the drive shaft about the rotational axis causes rotation of the first mount component; and
the second mount component secures to the securing mechanism of the first plate and the first end of the drive shaft extends into the recess.

4. The timer mount system of claim 1, wherein the panning mechanism rotates at least 360 degrees in a single direction after being wound.

5. The timer mount system of claim 1, wherein the panning mechanism comprises a plurality of gears and timer components.

6. The timer mount system of claim 1, wherein the plates are secured to the housing with a securing mechanism, such as adhesive, press-fit, threaded fit, screws, or snap-fit.

7. The timer mount system of claim 1, wherein the drive shaft is hex-shaped at the first end and at the second end.

8. The timer mount system of claim 1, wherein the socket reciprocal to the drive shaft comprises a hex-shaped socket.

9. The timer mount system of claim 1, wherein the first mount component is configured to couple to a camera or camera system.

10. The timer mount system of claim 9, wherein the first mount component has a plurality of protrusions at a second end, each protrusion comprises a hole at the distal end of the protrusion, allowing a camera or camera system with a reciprocal plurality of protrusions to interlock such that the holes of the protrusions are aligned along an axis and that a screw or pin can be inserted into the aligned holes, rotatably securing the camera or camera system to the first mount component.

11. The timer mount system of claim 1, wherein the second mount component is configured to couple to a mount platform.

12. The timer mount system of claim 11, wherein the second mount component has a plurality of protrusions at a second end, each protrusion comprises a hole at the distal end of the protrusion, allowing a mount platform with a reciprocal plurality of protrusions to interlock such that the holes of the protrusions are aligned along an axis and that a screw or pin can be inserted into the aligned holes, securing the mount platform to the first mount component.

13. The timer mount system of claim 1, wherein the respective securing mechanisms of the first and second plate comprise respective rings which protrude from the respective exterior surfaces of the first and second plates.

14. The timer mount system of claim 13, wherein a reciprocal mounting interface of the second mount component is a recess structured as a ring such that it mates with one of the respective rings of either the first or second plate.

* * * * *